United States Patent [19]

Holtey et al.

[11] 4,407,014

[45] Sep. 27, 1983

[54] COMMUNICATIONS SUBSYSTEM HAVING A DIRECT CONNECT CLOCK

[75] Inventors: Thomas O. Holtey, Newton, Mass.; Richard P. Kelly, Nashua, N.H.; Daniel G. Peters, Billerica, Mass.

[73] Assignee: Honeywell Information Systems Inc., Waltham, Mass.

[21] Appl. No.: 194,310

[22] Filed: Oct. 6, 1980

[51] Int. Cl.³ ............................ G06F 3/02; G06F 3/04
[52] U.S. Cl. ...................................... 364/200; 364/900
[58] Field of Search .............................. 364/200, 900

[56] References Cited

U.S. PATENT DOCUMENTS

| | | | |
|---|---|---|---|
| 3,906,163 | 9/1975 | Brenski et al. | 364/200 |
| 4,041,469 | 8/1977 | Jennings | 364/900 |
| 4,064,561 | 12/1977 | Jennings | 364/900 |

Primary Examiner—Felix D. Gruber
Assistant Examiner—D. H. Rutherford
Attorney, Agent, or Firm—Nicholas Prasinos

[57] ABSTRACT

Direct connect devices such as cathode ray tube displays are coupled to a communications controller through a long cable and a flexible line adapter package. Apparatus in the controller generates a clocking signal which is applied to a Universal Synchronous Receiver Transmitter (USRT) and to the direct connect device. The USRT receives data from a microprocessor and transmits a stream of data signals synchronized to the clocking signal. The data signals and the clocking signals are received by the direct connect device. The clocking signals strobe the data signals approximately in the center of a data pulse since transmission delays for the data signals and the clocking signals are approximately equal.

5 Claims, 4 Drawing Figures

COMMUNICATIONS SUBSYSTEM HAVING A DIRECT CONNECT CLOCK

BACKGROUND OF THE INVENTION

1. Field of Use

This invention relates generally to data processing systems and more specifically to the control of the clocking signals and data signals during the transmission of data from a communications controller to a direct connect device such as a cathode ray tube display.

2. Description of the Prior Art

Highly flexible and cost effective communications subsystems have been provided for coupling data processing systems to communication channels such as those associated with a publicly accessible (e.g. telephone) communications network. Such systems have been embodied in hardware/firmware architectures which respond to commands from a communication processor associated with a central mode, a transmit mode, or concurrent transmit/receive modes for transferring data messages between the communication processor and the communication channel. Data transfers occur under the control of a firmware system acting in concert with a microprocessor within the adapter to assemble and disassemble whole or partial data bytes of varying bit sizes. System architectures which have been used readily accommodate an expansion of capacity and exhibit dynamic flexibility.

However, present day communication line adapter systems are not able to process data where the device such as a cathode ray tube display is coupled to the adapter by a long cable and receives data signals in the order of 1,200 to 19,200 bits per second.

Prior art systems such as described in U.S. Application Ser. No. 53,110 which was abandoned May 29, 1981 entitled, "Communication Line Adapter for a Bit and Byte Synchronized Data Network" and U.S. Pat. No. 4,254,462 issued Mar. 3, 1981 entitled, "Hardware/Firmware Communication Line Adapter" and having the same assignee as the instant application, describe a system whereby the clocking signals for the transmission of data from the controller to the device were routed to the device and back to the controller for the clocking of data signals to the device. This gave the controller the appearance of always operating from an external clock. This approach satisfied the requirements of the prior art systems where the devices were relatively close to the controller with communications logic mounted on a single printed circuit board.

However, with the requirement to locate the device at a considerable distance from the communications controller, typically 4000 feet, the circuit delays in the clocking signals and the data signals in the prior art systems would result in marginal operation particularly at the higher baud rate.

OBJECTS OF THE INVENTION

It is an object of the invention to provide a data processing system with improved operation.

It is another object of the invention to provide a data processing system having an improved communications subsystem.

It is a further object to provide an improved means of generating external clocking signals for synchronous data terminal equipment.

It is still another object to provide a means of simultaneous control of the clocking signals in both the communications controller and the data communications equipment interchange circuits.

It is an additional object to minimize skew between transmitted clock and transmitted data signals.

It is yet another object to provide a clocking system for strobing the higher transmission data rates.

SUMMARY OF THE INVENTION

A data processing system includes a central processor subsystem, a memory subsystem and a communications subsystem, all coupled in common to a system bus. The communications subsystem includes a number of devices, each of which is coupled to a flexible line adapter package (FLAP) by a long cable, typically in the order of 4000 feet. The FLAPs are coupled to a communications controller. These devices are operative with the communications controller in a direct connect mode; that is, the controller generates the serial stream of data signals and the serial stream of clock signals. The direct connect device receives both the data signals and the clock signals and uses the clock signals to strobe the data signals.

A baud generator applies timing signals to a Universal Synchronous Receiver Transmitter (USRT) through a gate which is conditioned by a direct connect logic signal to generate the clock signals.

A microprocessor generates the direct connect logic signal for storage in both the communications controller and the FLAP.

The clock signals are also applied to the direct connect device through a gate in the FLAP which is also conditioned by the direct connect logic signal and the long cable. Since the circuit delay times for the clock signals and the data signals to reach the direct connect device are approximately equal, the clock signals strobe the data signals at approximately the center of the data signals.

DESCRIPTION OF THE PREFERRED EMBODIMENT

Figure 1:
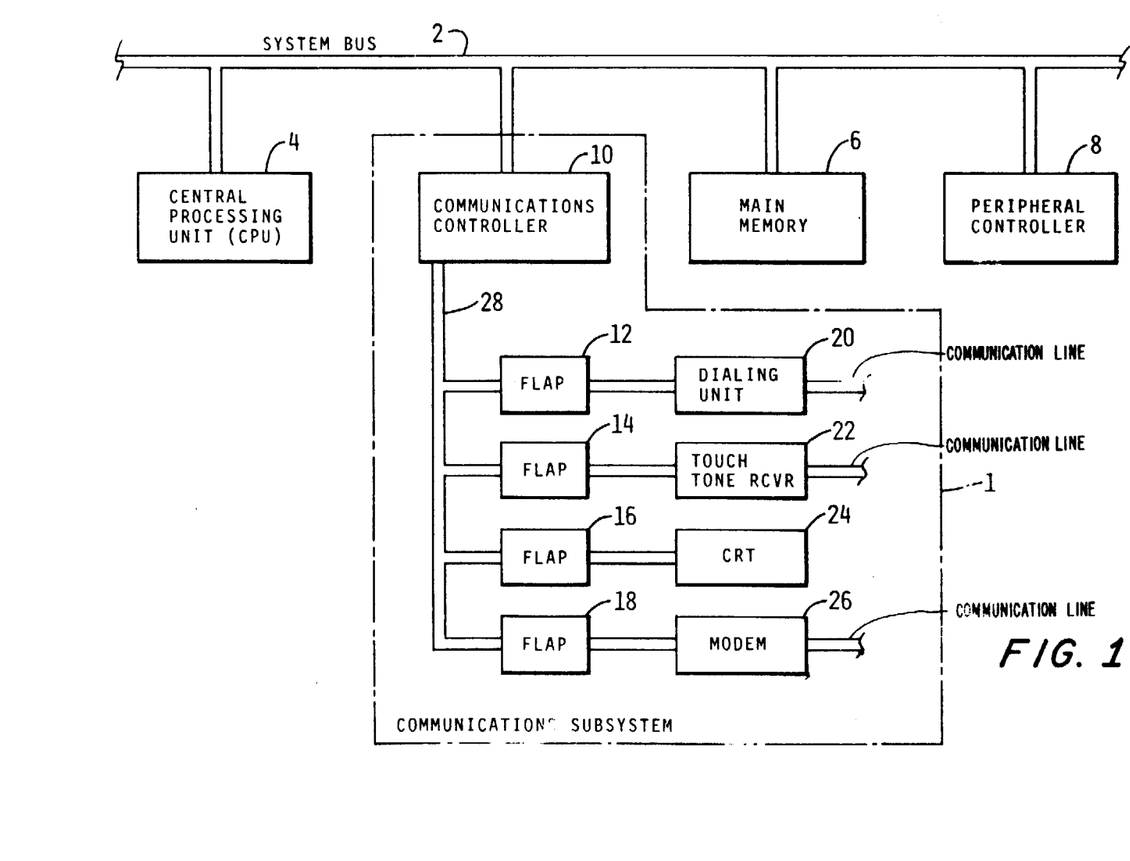
FIG. 1 is a block diagram of the data processing system including the communications subsystem.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically could be a dialing unit 20. Coupled to FLAP 14 typically could be a touch-tone receiver 22. Coupled to FLAP 16 typically could be a cathode ray tube (CRT) display 24. Coupled to FLAP 18 typically could be a modem 26.

The communications subsystem 1 receives information from devices, typically the touch-tone receiver 22 and the modem 26, through FLAPs 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT).

Figure 2:
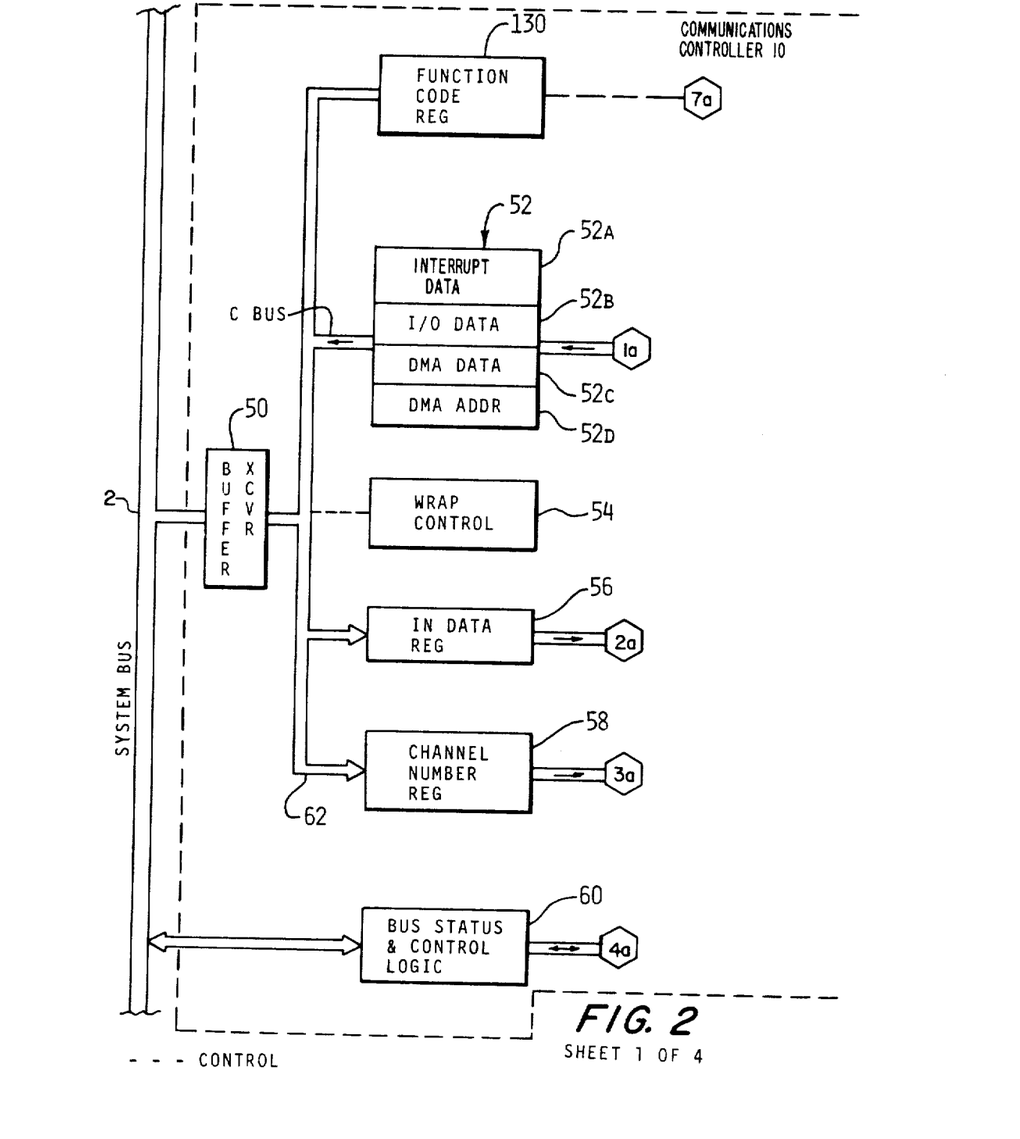
FIG. 2 is a block diagram of the communications subsystem.

FIG. 2 shows a block diagram of the communications subsystem 1 including the communications controller 10 and the FLAPs 12, 14, 16 and 18. Information is received by communications controller 10 from main memory 6 via system bus 2, a transceiver 50, and C bus 62, and is stored in an in data register 56 under control of bus and status logic 60. Bus and status logic 60 is described in U.S. Pat. No. 4,293,908 issued Oct. 6, 1981 entitled, "Data Processing System Having Direct Memory Access Bus Cycle". Information is transferred to the system bus 2 via a random access memory (RAM) 52, C bus 62 and transceiver 50.

Information may be routed from RAM 52 to in data register 56 since transceiver 50 is capable of isolating the C bus 62 from system bus 2 during a wrap-around operation. The wrap-around operation under control of a wrap control 54 allows information to be transferred between RAM 52 and the registers coupled to the C bus 62. Ram 52 contains four 16-bit registers, an interrupt data register 52a, an input/output data register 52b, a direct memory access (DMA) register 52c and a DMA address register 52d.

The interrupt data register 52a stores the channel number of the CPU 4 and the interrupt level of the information received by the communications subsystem 1 for transfer to main memory 6.

Communications controller 10 transfers information to CPU 4 over system bus 2 by including the CPU 4 channel number with the information.

The input/output data register 52b stores information, status or device identification, in response to a CPU 4 input request. The DMA data register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1, the input/output function the communications controller 10 is to perform.

A microprocessor 96 controls the operation of the communications controller 10. The microprocessor 96 communicates with the system bus 2 via a U bus 82, a transceiver 98, I bus 64, RAM 52 for sending data to the system bus 2; and in data register 56 for receiving data from system bus 2, and transceiver 50. Microprocessor 96 generates address signals which are sent over an address bus 100.

Also coupled to U bus 82 are universal synchronous receive/transmit receivers USRT-2 88 and USRT-3 90 communication interfaces. Associated with USRT-2 88 is a baud rate generator BAUD GEN-2 68 and an LR2-2 register 66. Associated with USRT-3 90 is a baud rate generator BAUD GEN-3 69 and an LR2-3 register 67. BAUD GEN-2 68 and BAUD GEN-3 69 receive signals from I bus 64 to specify the baud rate for the devices directly connected to communications subsystem 1, and also indicates to USRT-2 88 and USRT-3 90 respectively, the baud rate for transmission to an external device.

The LR2-2 register 66 and LR2-3 register 67 store signals from I bus 64 for controlling clear, idle link state, transmit-on, receive-on, and loop modes of USRT-2 88 and USRT-3 90 respectively.

An LR5 multiplexer (MUX) 128 receives output status signals indicating transmit underrun, byte available, status available, idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal from PROM 70 is applied to intercept control logic 80. Microprocessor 96 queries intercept control logic 80 for the interrupt signal. Microprocessor 96 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP strobes and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 56, I bus 64, transceiver 98, U bus 82, a transceiver 108, and an M bus 110 to RAM 118. This is accomplished by microprocessor 96 generating appropriate address locations which are transferred to RAM 118 via address bus 100 and paging logic 116.

The communications controller 10 continually scans the communication lines from FLAPs 12, 14, 16 and 18 for any activity. Upon detection of a receive channel activity, the receive CCP for that channel is initiated. Under CCP control the communications controller 10 receives and checks the data byte for correct parity, updates the LCT status and CCB control progress, and delivers the data byte to main memory 6. The CCP terminates after each completed transfer to main memory 4, or when interrupted by a higher priority channel.

The CCB area of RAM 118 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the data transfer is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c or 122d logic, the clock logic 94 phase 1 and phase 2 timing signals are slowed to a 1600 nanosecond or 0.625 megahertz clock rate. The clock logic 94 outputs a number of clock phase signals in each microprocessor 96 phase 1 and phase 2 cycles. The phase 1 and phase 2 cycles are slowed to enable additional clock phase signals to control the FLAP 122a-d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c or 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel.

The transmit underrun operation is described in U.S. Application Ser. No. 194,655 filed Oct. 6, 1980, entitled "A Communications Subsystem with an Automatic Abort upon Transmit Underrun". The idle link state operation is described in U.S. Application Ser. No. 194,698 filed Oct. 6, 1980, entitled "A Communication Subsystem Idle Link State Detector" now patent 4,379,340.

An address decode unit 114 receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 122a, 122b, 122c and 122d as well as control signals which are enabled at the respective FLAP registers 122a-d by the particular strobe signal. Stored are bits indicating the direct connect, clear to send and protocol modes of operation and described in U.S. Application Ser. No. 194,311 filed Oct. 6, 1980, entitled "A Communications Subsystem Having a Self-Latching Data Monitor and Storage Device".

An external connector 84 is provided for testing purposes. It allows test equipment to be connected to U bus 82 to exercise the communications controller 10 through firmware test routines applied externally. PROM 126 may be disabled for certain test sequences.

A paging logic unit 116 in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication lines. The paging logic 116 allows a single firmware routine to be operative with each communication line.

Data is transferred between the U bus 82 and the FLAPs 122a-d via F bus 112 and a transceiver 104.

The FLAP registers 122a-d are operative with the FLAP line interface receivers and drivers 124a, 124b, 124c and 124d for communication with devices 20, 22, 24 and 26 respectively.

Figure 3:
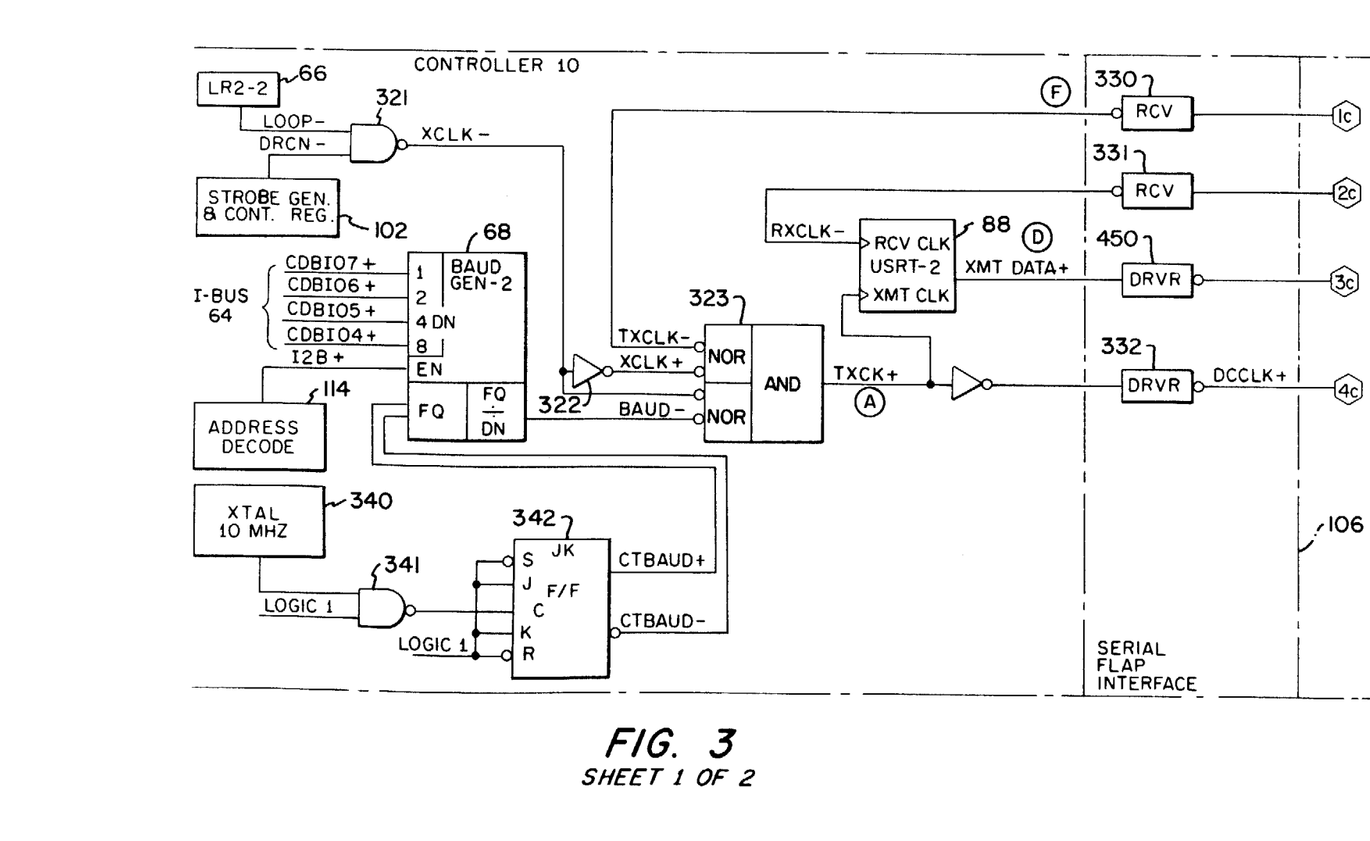
FIG. 3 is a detailed logic diagram showing the path of the clock and data signals.

Referring to FIG. 3, the communications controller 10 provides timing signals to control both the CRT 24 and the USRT-2 88. BAUD generator-2 68 provides the basic timing via a timing signal BAUD-. Baud generator-2 68 is coupled to I bus 64 via bus signals CDBI04-07+ which indicate the baud rate frequency used by communications controller 10 and CRT 24.

| Baud Rate Frequency (bits per second) | |
| --- | --- |
| CDBI | CDBI |
| 04–07+ | 04–07+ |
| 0000  800 bps | 0100  2400 bps |
| 0001  1200 | 0101  4800 |
| 0010  1760 | 0110  9600 |
| 0011  2151 | 0111  19200 |

Baud generator-2 68 is enabled by an I2B+ signal from the address decode logic 11. A free running oscillator 340, operating typically at 10MHZ, applies a signal to a flop 342 through a NAND gate 341. The output signals CTBAUD- and CTBAUD+ generate 5 megahertz signals which are applied to the baud generator-2 68 and establish the baud rate for CRT 24.

The BAUD- clocking signal is applied to an AND-/OR Invert gate 323 which is active during the direct connect mode. The direct connect signal DRCN- at logical ONE, from the strobe and control register 102, and the LOOP-signal at logical ONE, from the LR2-2 register 66, indicates that this is not a maintenance mode as applied to the inputs of a NAND gate 321. The strobe generator and control register is described in copending related U.S. Application Ser. No. 194,311 entitled, "A Communications Subsystem Having a Self-Latching Data Monitor and Storage Device". The output clock signal XCLK- at logical ZERO conditions NOR/AND gate 323 to accept the BAUD- signal during the direct connect mode. The output clock signal TXCK+ is applied to a transmit clock input of USRT-2 88 and a driver 332 through an inverter 324. The output signal DCCLK+ is applied to the input of a NAND gate 434 through a receiver 432 and an inverter 433. A FLAP direct connect signal FDRCN- is applied to the other input terminal of NAND gate 434 from a register 410 through an inverter 413. The FDRCN- signal is stored in register 410 through the F bus 112 simultaneously with the DRCN- signal which is stored in the strobe generator and control register 102 from the M bus 110. The NAND gate 434 output signal FDRCK- at logical ZERO activates a driver 442 and a driver 443 through NOR gates 460 and 462 respectively. Drivers 442 and 443 are both active during the direct connect mode since the new sync signal NSYN- and the select data speed signal SPDS- are both at logical ONE. The driver 443 output signal SPEED SELECT provides the receive clock signal RXCLK+ for the CRT 24 via a receiver 468. This clocks the data received over signal line SEND DATA via USRT-2 88, data signal XMT DATA via a driver 450, a receiver 452, and a driver 454.

The driver 443 output signal SPEED SELECT is applied to the CRT 24 as the transmit clock signal TXCLK+. The SPEED SELECT signal is also applied to the receive clock input terminal of USRT-2 88 signal RECV TIMING via a receiver 468, and a driver 464, a receiver 441, a driver 431, and as signal RXCLK- via a receiver 331.

The clock signal BAUD- is applied to an input of NOR/AND, gate 323 which is operative when the clock is generated by the communications controller 10; that is signal DRCN- is at logical ZERO. This forces the XCLK+ signal to logical ZERO via NAND gate 321 and an inverter 322. The clock signal BAUD- is therefore applied to the XMT CLK clock terminal of USRT-2 88 via signal TXCK+.

When the USRT-2 88 communicates with a device in other than a direct connect mode, the device generates the clock signal TXCLK- through a receiver 440, a driver 430 and a receiver 330. When the CRT 24 sends data to the USRT-2 88, the TXCLK+ transmit signal is applied to the RCV CLK terminal of USRT-2 88 through a receiver 441, a driver 431 and a receiver 331. The prior art generates the TXCLK- clock signal via a driver 442, a receiver 440, a driver 430, and a receiver 330.

Figure 4:
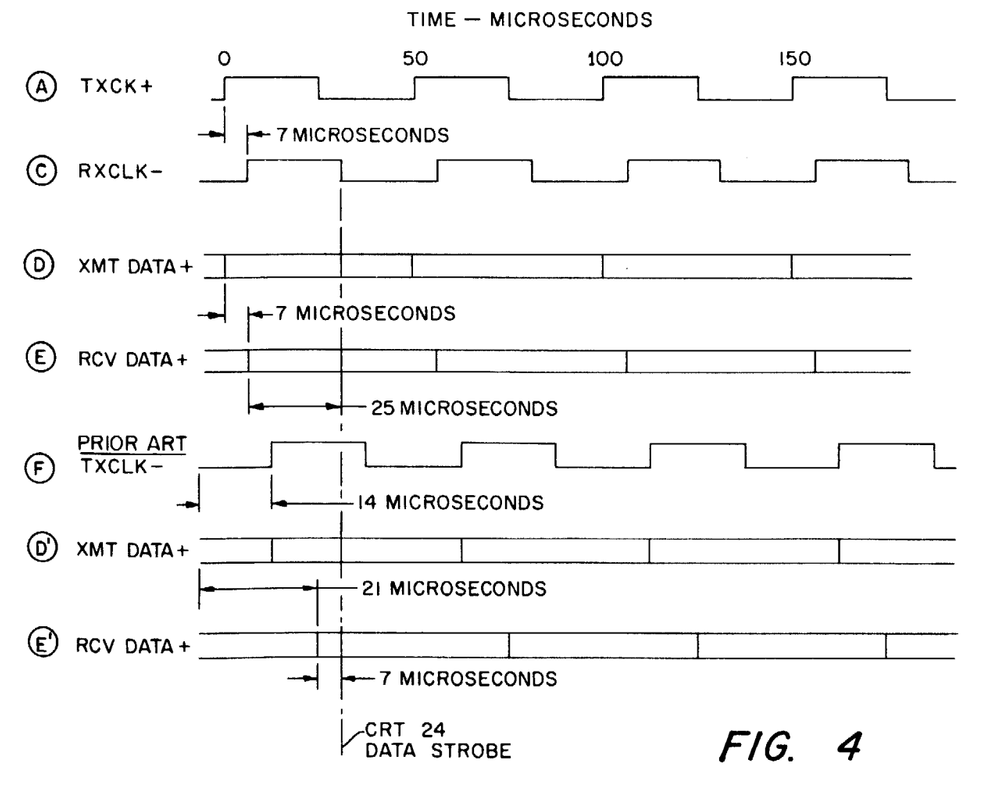
FIG. 4 is a timing diagram of the clock and data signals for the instant invention and a comparison with the prior art logic using the instant invention configuration with the long cable.

Referring to FIG. 4 (the circled letters refer to signal locations on FIG. 3), the clock signal TXCK+ shows a typical 50 microsecond clock cycle. This signal is redriven at the end of the 4000 feet DCE cable as the RXCLK+ signal delayed 7 microseconds from the TXCK+ signal for both the instant invention and the prior art.

The TXCK+ clock signal strobes the data from the USRT-2 88 on signal line XMT DATA. The data is received at the RCV DATA signal line delayed 7 microseconds. The RXCLK+ clock signal strobes the RCV DATA signal at the midpoint of the data signal.

In the prior art, the TXCLK- signal would be applied to the XMT CLK terminal of the USRT 14 microseconds after the rise of the RXCK+ signal. The TXCLK- signal would strobe the data stored in the USRT-2 88 on signal line XMT DATA. The data would be received at the RCV DATA signal 21 microseconds after the rise of the TXCK+ clock. The prior art RCV DATA signal would be strobed by the RXCLK+ signal in the CRT 24 7 microseconds after the 50 microsecond data signal is received instead of 25 microseconds after receiving the data as in the instant invention.

Drivers 332, 430, 431, and 450 are Motorola MC 1488 circuits. Drivers 442, 443, 454, and 464 are Motorola MC 3488 circuits. Receivers 440, 441, 466, and 468 are Motorola MC 3468 circuits. The Motorola circuits are described in the "Motorola Linear Integrated Circuits" catalog prepared by the Technical Information Center, Motorola Inc. copyright 1979, Motorola Semiconductor Products Inc., Box 20512, Az. 85036.

Receivers 330, 331, 432 and 452 are 75154 circuits described in "The Linear Interface Circuits Data Book for Design Engineers", First Edition 1973, published by Texas Instruments Inc.

Registers 400 and 410 are 74LS273 logic circuits, NOR/AND gate 323 is a 74LS51 logic circuit. Flop 342 is a 74S112 circuit. These circuits are described in "The TTL Data Book for Design Engineers", Second Edition 1976, published by Texas Instrments Inc.

The baud generator-2 68 is a 5016 circuit described in the SMC Data Catalog 1979, published by Standard Microsystems Corp., 35 Marcus Boulevard, Haugpauge, NewYork 11787.

The USRT-2 88 is a Signetics 2652 Multi-Protocol Communicatons circuit described in "Signetics Bipolar/Mos Microprocessor Data Manual", copyright 1977 by Signetics Corp., 811 East Arques Avenue, Sunnyvale, Ca. 94080.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the invention, therefore, to limit the invention only as indicated by the scope of the claims.

What is claimed is:

1. In combination with a communication line coupled to a data processing system comprising a system bus, at least one central processing unit (CPU), one main memory system, one peripheral controller and a communications subsystem, all coupled in common to the system bus, said communications subsystem including a communications controller coupled to said system bus, a plurality of flexible line adapters (FLAPs), each coupled to said communicatons controller, and further including typical communication devices such as a modem, a dialing unit, a touch-tone receiver, and a cathode ray tube (CRT), a plurality of each of said typical communication devices coupled to one each of said FLAPs, a communications subsystem having a direct connect logic apparatus for causing clock signals to be transmitted to each direct connected device of said typical communication device, said apparatus comprising:
   (a) a data signal line coupled to said communications controller and to said typical communication devices;
   (b) a clock signal line also coupled to said communications controller and to said typical communication devices; and,
   (c) a direct connect logic device coupled to said data signal line and clock signal line for receiving the data signals and clock signals generated by the communications controller and transmitting the data signals and clock signals to said typical communication devices wherein the delays in the data signals and the clock signals are substantially equal.

2. The apparatus as recited in claim 1 including:
   (a) an I bus coupled to said system bus;
   (b) a universal receive transmit (USRT) device coupled to said I bus; and
   (c) a baud generator also coupled to said I bus for generating and applying timing signals to said USRT.

3. The apparatus as recited in claim 2 including an AND gate coupled to said baud generator and to said USRT for strobing the timing signals to said USRT, whereby the data signals provided to said USRT are strobed in the center of the data pulse.

4. The apparatus as recited in claim 3 including a U bus coupled to said I bus and further including a microprocessor ($\mu$P) for generating a direct connect logic signal for conditioning said baud generator to generate the timing signals.

5. The apparatus as recited in claim 4 wherein said timing signals are also stored in said communications controller and one of said FLAPs.

* * * * *